(12) United States Patent
Susnjara

(10) Patent No.: US 9,808,950 B2
(45) Date of Patent: Nov. 7, 2017

(54) CNC MACHINE ASSEMBLY

(71) Applicant: THERMWOOD CORPORATION, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 294 days.

(21) Appl. No.: 14/575,650

(22) Filed: Dec. 18, 2014

(65) Prior Publication Data

US 2016/0174714 A1  Jun. 23, 2016

(51) Int. Cl.

| | |
|---|---|
| *B32B 37/06* | (2006.01) |
| *A47B 96/20* | (2006.01) |
| *B32B 38/04* | (2006.01) |
| *B26D 7/01* | (2006.01) |
| B32B 38/00 | (2006.01) |
| B32B 37/18 | (2006.01) |
| B32B 38/10 | (2006.01) |
| B32B 37/12 | (2006.01) |
| B32B 37/10 | (2006.01) |
| B32B 38/18 | (2006.01) |

(52) U.S. Cl.
CPC .............. *B26D 7/018* (2013.01); *A47B 96/20* (2013.01); *A47B 96/205* (2013.01); *A47B 2096/208* (2013.01); *B29C 2793/0009* (2013.01); *B29C 2793/0027* (2013.01); *B32B 37/06* (2013.01); *B32B 37/1018* (2013.01); *B32B 37/1207* (2013.01); *B32B 37/18* (2013.01); *B32B 38/0004* (2013.01); *B32B 38/0036* (2013.01); *B32B 38/10* (2013.01); *B32B 38/105* (2013.01); *B32B 38/1808* (2013.01); *B32B 38/1858* (2013.01); *Y10T 156/108* (2015.01); *Y10T 156/1064* (2015.01); *Y10T 156/1082* (2015.01); *Y10T 156/1093* (2015.01); *Y10T 156/1322* (2015.01); *Y10T 156/1348* (2015.01); *Y10T 156/1702* (2015.01); *Y10T 156/1788* (2015.01)

(58) Field of Classification Search
None
See application file for complete search history.

(56) References Cited

U.S. PATENT DOCUMENTS

| | | | | |
|---|---|---|---|---|
| 5,658,522 | A * | 8/1997 | Fischer | B29C 43/02 264/328.7 |
| 2002/0091460 | A1* | 7/2002 | Allen | G05B 19/4166 700/173 |
| 2006/0006581 | A1* | 1/2006 | St. Germain | A22C 7/0038 264/319 |
| 2009/0140465 | A1* | 6/2009 | Plumpton | B29C 45/2711 264/404 |

* cited by examiner

Primary Examiner — Linda L Gray
(74) Attorney, Agent, or Firm — Bookoff McAndrews, PLLC

(57) ABSTRACT

An assembly for producing cabinet doors including a CNC machine provided with a porous worktable, means for positioning workpieces thereon, means for applying a vacuum to such porous worktable for adhering such workpieces thereto and means for machining such workpieces adhered to such worktable; and means for thermally deforming a thermally pliable foil to laminate such workpiece.

10 Claims, 5 Drawing Sheets

CNC MACHINE ASSEMBLY

This invention relates to an assembly for and a method of producing foil laminated products and more particularly to an improved assembly for and method of economically producing any volume of such products.

BACKGROUND OF THE INVENTION

In the production of cabinet doors, such products typically have been initially machined from sheets of material into various sizes and shapes, and then finished by applying a paint or lacquer utilizing a spray system to provide a particular color or design. An improved finishing method has consisted of applying a thin, compliant thermoplastic film over such doors which has a number of advantages over traditional spray finishing methods including the elimination of change-over processes, the ability to produce different appearances and a reduction of hazardous materials. Such method is known in the industry as thermofoiling.

In the use of such method in the production of cabinet doors, the doors are first formed from a sheet of medium density fiberboard (MDF) material on a CNC router, and then removed and transferred to a second machine commonly known as a thermo-foil vacuum press which applies a thin finishing film on the machined doors. Because of the considerable investment cost of such machines, the operating cost of such machines and the manual time and effort required in the handling and transfer of such workpieces and operating such machines, such arrangement and method has been found to be economically suitable with respect to long runs of large quantities of items but unsuitable with respect to short runs of small quantities of items.

Accordingly, it is the principal object of the present invention to provide an assembly and method to economically form and apply a film of material on either a large or small number of workpieces, on a single assembly, in a short span of time, utilizing a minimum amount of manual labor.

SUMMARY OF THE INVENTION

The principal object of the present invention is achieved by means of an assembly including a single CNC machine provided with a porous worktable, means for positioning a workpiece thereon, means for applying a vacuum to such porous worktable for adhering such workpiece thereto and means for machining a workpiece adhered to the worktable; and means for thermally deforming a thermally pliable foil positioned atop a machined workplace disposed on such worktable to form a layer thereon. In the preferred embodiment of the invention, the machine is programmed upon signal to adhere a workpiece positioned on the worktable thereof, cut and contour such positioned workpiece, heat a thermoplastic foil placed on a machined workpiece and machine off excess foil; and the operator simply functions to suitably program the machine, mount the workpiece, signal the machining sequence of the workpiece, apply the thermoplastic foil on the machined workpiece and position a heating element in proximity thereto, signal the trimming of the excess foil and then simply offloading the finished workpiece and disposing of scrap.

DETAILED DESCRIPTION OF THE PREFERRED EMBODIMENT OF THE INVENTION

Figure 1:
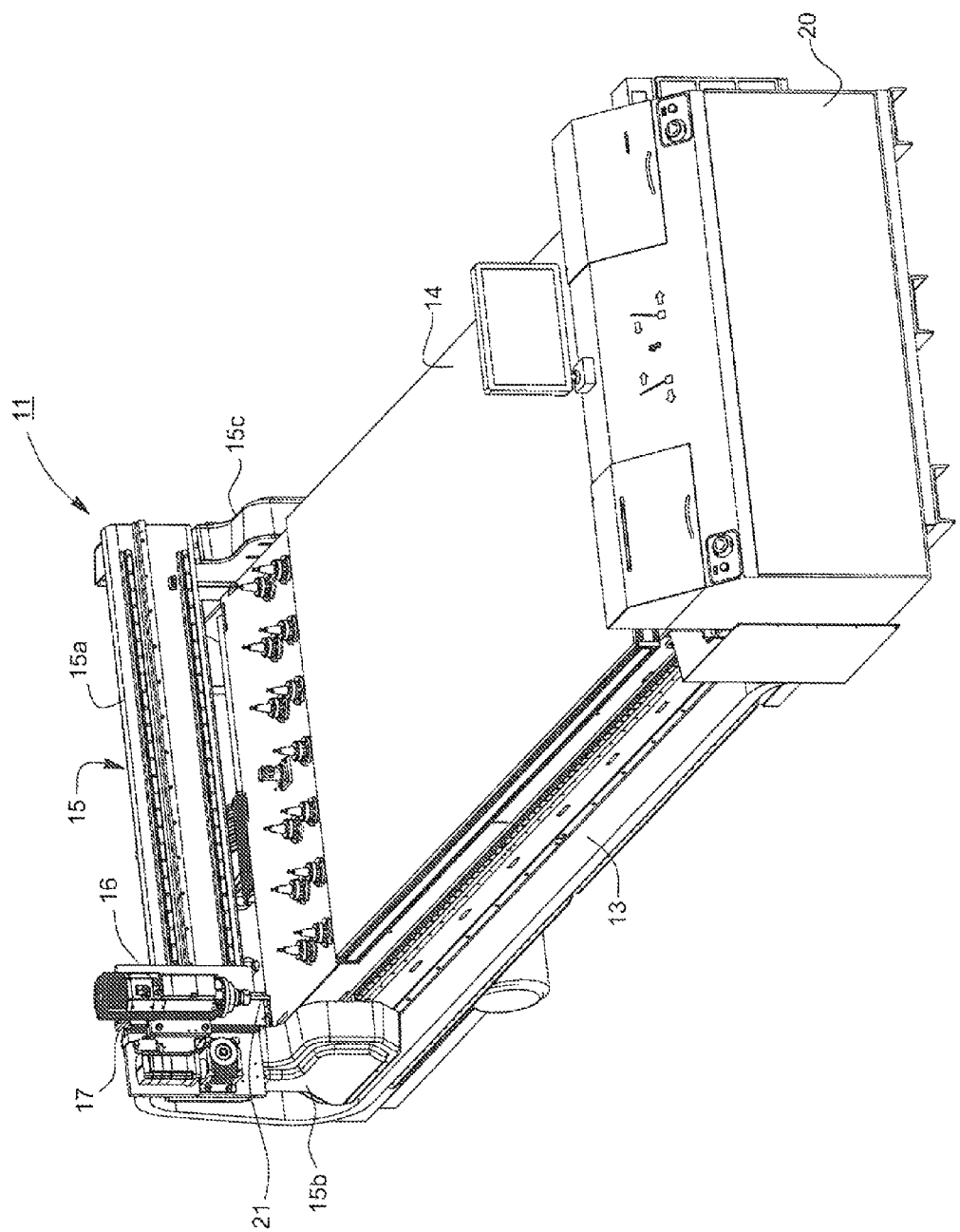
FIG. 1 is a perspective view of a component of the inventive assembly.

Referring to the drawings, there is illustrated an assembly 10 embodying the present invention including a CNC machine component 11 and a heating component 12. The machine includes a bed 13 provided with a porous worktable 14 mounted thereon, closing a chamber to which a vacuum may be applied by a vacuum pump mounted on the bed, a gantry 15 supported on the worktable, a carriage 16 mounted on the gantry and a tool holder 17 mounted on the carriage. The gantry includes a transversely disposed portion 15a spaced above the plane of the worktable and a set of depending leg portion 15b and 15c supported on and displaceable along a set of slides provided along the sides of the bed. The gantry is displaceable longitudinally or along the x-axis by means of a pair of threaded members journalled on the sides of the bed, threadedly connected to the leg portions thereof and driven by a set of servo motors. Carriage 16 is supported on a set of horizontal slides provided along a front face of transversely disposed gantry portion 15a, and is displaceable transversely or along the y-axis by means of a threaded member journalled in portion 15a, threaded in carriage 16 and driven by a servo motor. Similarly, tool holder 17 is mounted on a set of vertical slides provided along the front face of carriage 16, and is displaceable vertically or along the z-axis by means of a threaded member journalled in the carriage, threaded into the tool holder and driven by a servo motor. The several servo motors are controlled by a computer 20 suitably programmed and operable to operate and guide a selected tool 21 positioned and accessible on worktable 14 in the conventional manner.

Figure 2:
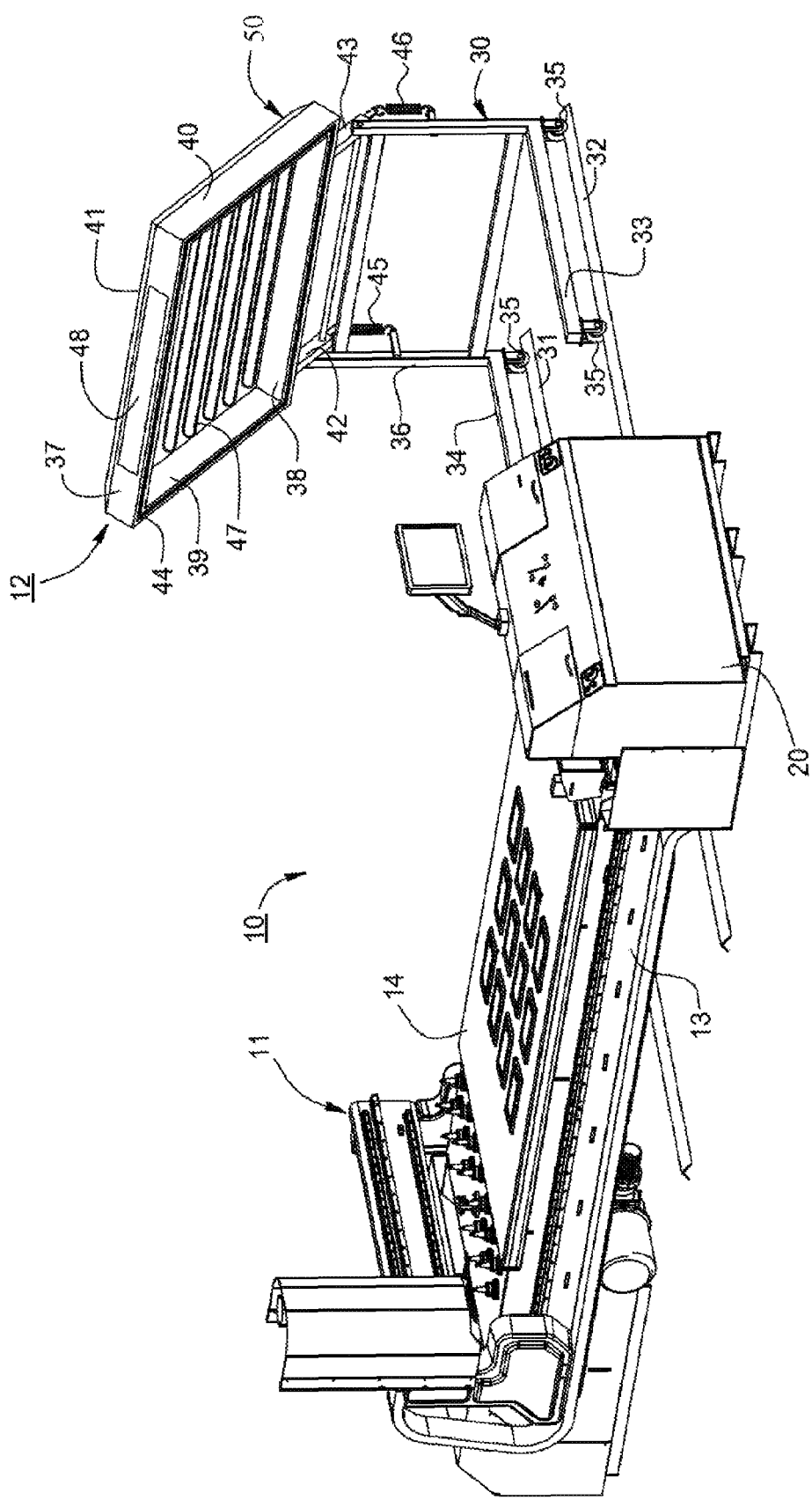
FIG. 2 is a perspective view of the machine and heating components of the assembly, illustrating the heating component in a spaced, non-operating condition.
Figure 3:
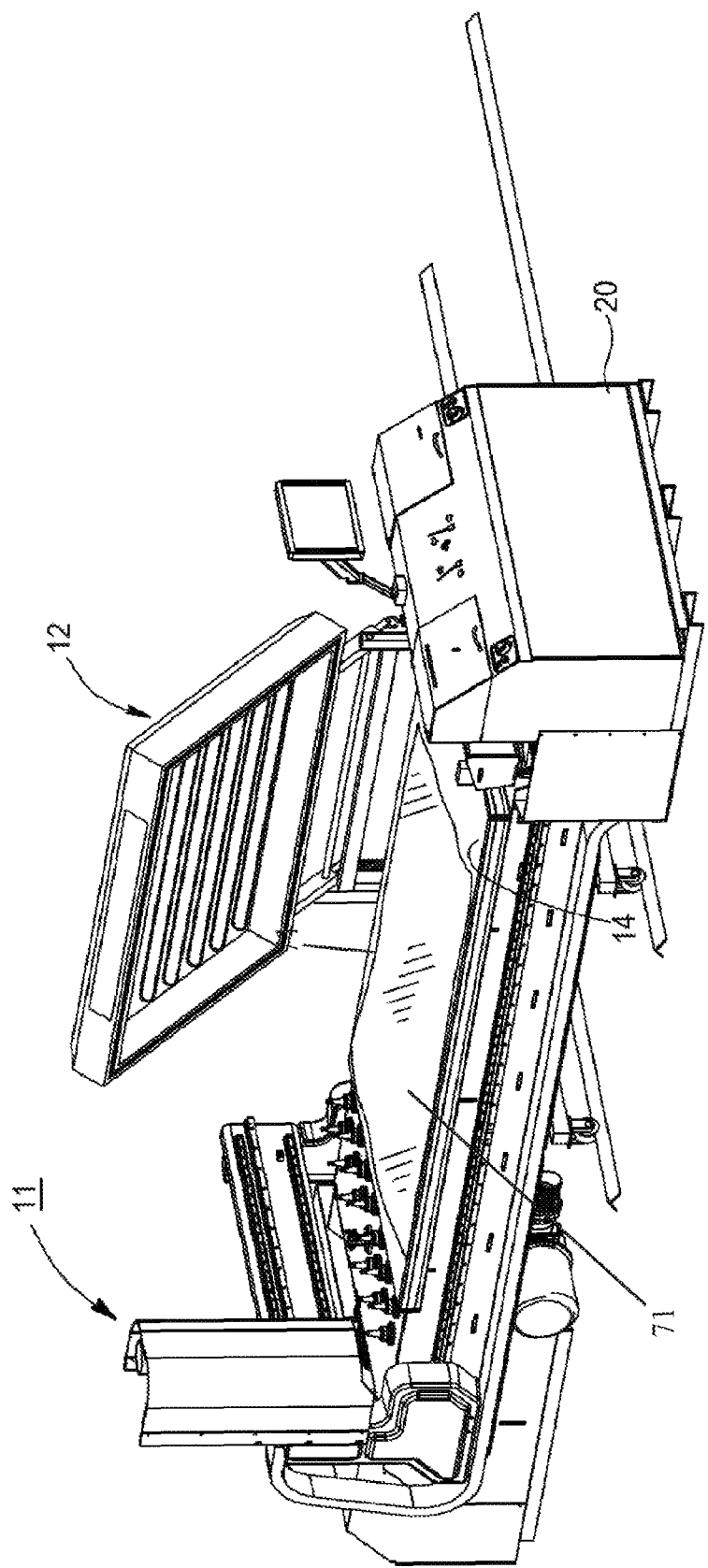
FIG. 3 is a perspective view of such assembly, illustrating the heating component having been displaced to a non-operating position adjacent the machine component.
Figure 4:
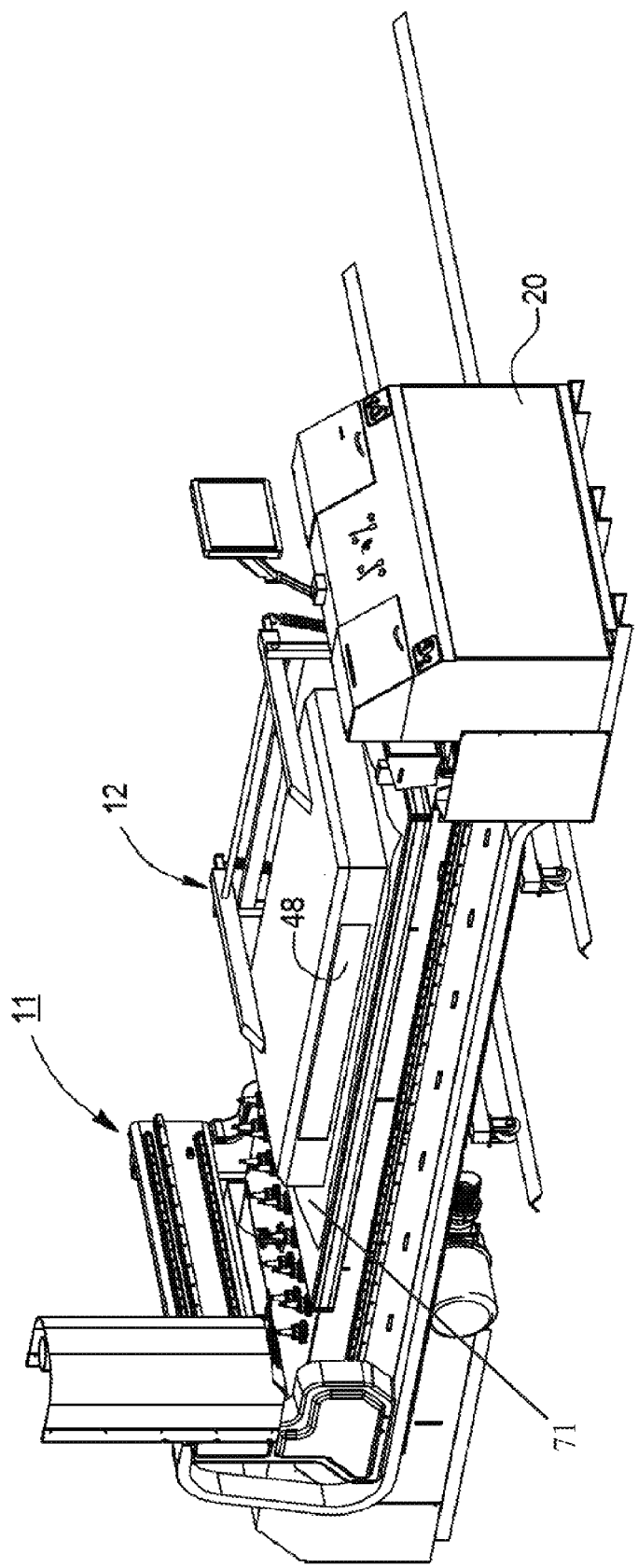
FIG. 4 is a perspective view of such assembly, illustrating the heating component in position for heating a thermally pliable foil having been positioned atop a workpiece disposed on the worktable of the machine component.
Figure 5:
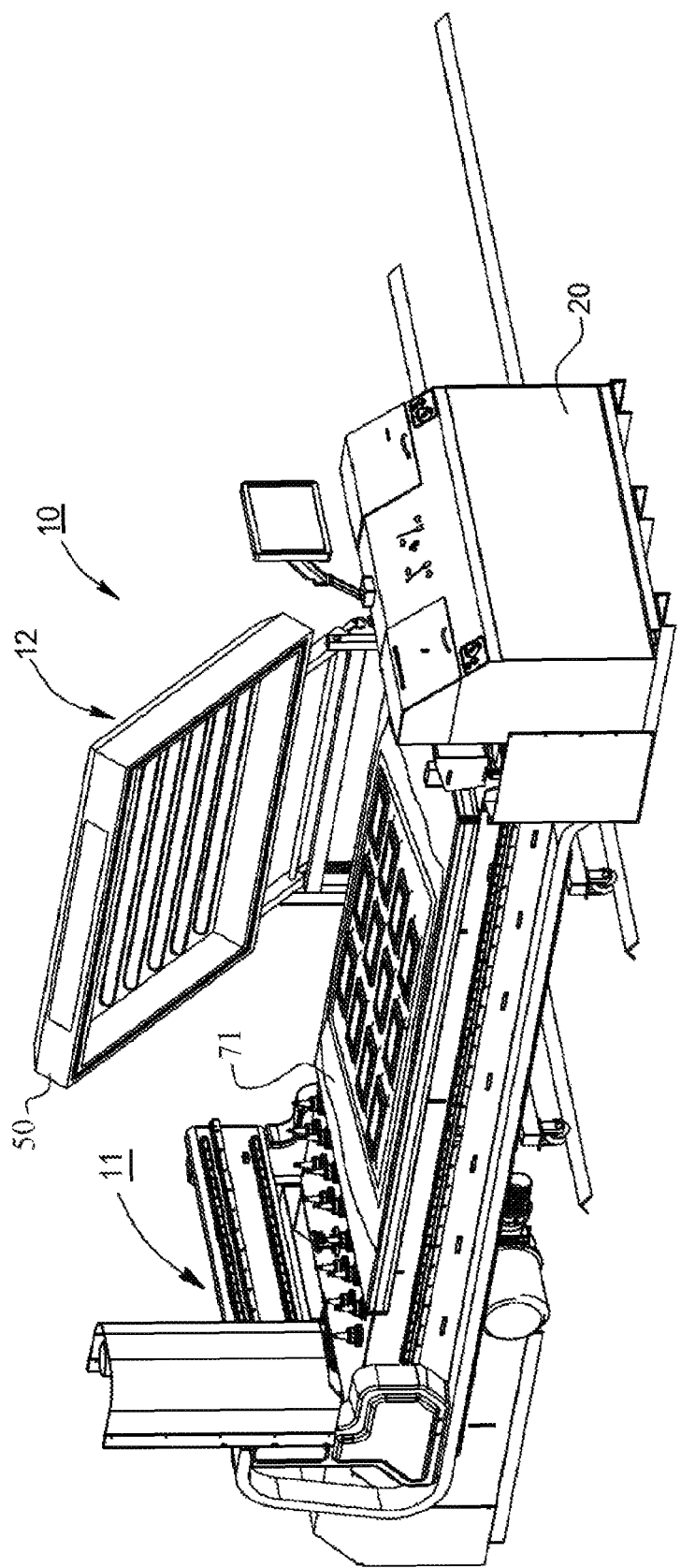
FIG. 5 is a perspective view of such assembly, illustrating the heating component having been retracted.

As illustrated in various conditions in FIGS. 2 through 5, heating component 12 includes a carrier 30 supported on and displaceable along a set of spaced tracks 31 and 32, each provided with a v-shaped, cross-sectional configuration, disposed transversely relative to machine component 11 and projecting from a position spaced a short distance from machine component 11 to a position underlying thereof, and an enclosure 50. The carrier is provided with a pair of spaced beams 33 and 34 supported on a set of rollers 35 ridable on tracks 31 and 32, and an upright support frame 36 mounted on the outer distant ends of beams 33 and 34. Enclosure 50 comprises a pair of front and rear panels 37 and 38, a set of side panels 39 and 40 and a top panel 41, providing a lower opening. Rear panel 38 is provided with a set of rearwardly projecting portions 42 and 43 which are pivotally connected to the upper end of support frame 36 permitting enclosure 50 to pivot about an axis disposed parallel to the x-axis of the machine, between an upper position as shown in FIGS. 2 and 3 and a lower position in overlying contact with worktable 14, as shown in FIG. 4. The contact edges of enclosure 50 are provided with a gasket 44 about the perimeter of enclosure 50, engageable with the worktable to seal enclosure 50 when in a downwardly pivoted position, and a pair of springs 45 and 46 interconnecting the free ends of projecting arms 42 and 43 to bias enclosure 50 as shown in FIG. 2. Disposed within enclosure 50 and mounted on the inner side of enclosure panel 41 is a set of electrically activated heating elements 47 which may be controlled by computer 20 or activated by an operator. The attachment of enclosure 50 to the support carriage and the arrangement and function of springs 45 and 46 are to bias enclosure 50 into the open or raised position as shown in FIGS. 2, 3 and 5, and allow it to be manually positioned on the worktable upon having been pivoted beyond a certain angle beyond the point of effect of the biasing action of the springs.

In the use of assembly as described to form one or more cabinet doors provided with a thermally pliant film, with carrier 30 spaced from the machine and enclosure 50 thereof in an upper or retracted position as shown in FIG. 2, and perhaps a porous spoil board having been positioned on and adhered to the worktable, a sheet of material perhaps consisting of a medium density fiberboard (MDF) is positioned on the spoil board, usually with the edges thereof abutting or suitably spaced from a set of peripherally spaced stops provided on the machine bed. With such workpiece thus positioned, the machine controls are operated pursuant to the inputted program to shape and contour one or more of the doors in the conventional manner. With the machining of the workpiece having been completed, the machined workpieces retained on the worktable and the scrap having been removed from the worktable, a thermally pliant foil 71, as shown in FIGS. 3, 4, and 5, provided with a thermally activated adhesive on the underside thereof is positioned atop the machined workpiece or workpieces disposed on the worktable.

With the machined workpiece or workpieces thus positioned on the worktable and foil 71 positioned atop thereof, the carriage is rolled by the operator from the spaced positioned as shown in FIG. 2 to the position adjacent the side of the machine worktable as shown in FIG. 3, and enclosure 50 is pivoted downwardly onto the worktable to encompass the machined workpiece or workpieces disposed therein with foil 71 placed thereon, as shown in FIG. 4. The operator then operates suitable controls to energize heating elements 47 of enclosure 50 to heat the overlying foil 71, causing it to deform over the workpiece or workpieces and become adhered thereto. The progress of the compliant action of foil 71 may be monitored by viewing the progress in the deformation of foil 71 through a window 48 provided in front panel 37 of enclosure 50.

Upon completion of the application of the foil material as described, the enclosure may be retracted to its upper position as shown in FIG. 5 and the carriage may be retracted to its spaced position as shown in FIG. 2.

The laminated doors are then completed by operating the machine to sever and scrap the portions of excess foil. The finished doors may then be removed from the worktable of the machine, perhaps further finished and either stored for further usage or transferred to an assembly area for the production of cabinets utilizing such doors.

The assembly as described and the method of use thereof provides a means of simply, efficiently and economically producing either a low or high volume of laminated doors without incurring the expense of acquiring and operating a separate a thermo-foil vacuum press.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A CNC machine assembly, comprising:
   a machining component comprising:
      a worktable configured to receive a workpiece thereon; and
      a tool holder displaceable relative to the worktable, wherein the tool holder is displaceable relative to the worktable in a first direction, a second direction orthogonal to the first direction, and a third direction orthogonal to the first and second directions; and
   a heating component comprising:
      a plurality of heating elements disposed within an enclosure, wherein the enclosure is movable relative to the machining component.

2. The CNC machine assembly of claim 1, wherein the worktable is a porous worktable.

3. The CNC machine assembly of claim 2, wherein the porous worktable is operably coupled to a vacuum source configured to apply a suction to the porous worktable.

4. The CNC machine assembly of claim 1, wherein the plurality of heating elements is disposed on an inner surface of a top wall of the enclosure.

5. The CNC machine assembly of claim 1, wherein the enclosure includes a plurality of side walls depending from the top wall, wherein each of the side walls is positioned orthogonally to the top wall.

6. The CNC machine assembly of claim 5, wherein one of the side walls of the plurality of side walls includes a window therein.

7. The CNC machine assembly of claim 1, wherein the enclosure is movable laterally and rotatably relative to the worktable of the machining component.

8. The CNC machine assembly of claim 5, wherein each side wall of the plurality of side walls includes a gasket configured to create a seal when the enclosure contacts the worktable.

9. The CNC machine assembly of claim 1, wherein the enclosure is movable between a worktable-engaging position and a raised position.

10. The CNC machine assembly of claim 9, further comprising at least one spring operably coupled to the enclosure to bias the enclosure in the raised position.

\* \* \* \* \*